(12) United States Patent
Wieres

(10) Patent No.: US 6,634,542 B1
(45) Date of Patent: *Oct. 21, 2003

(54) METHOD FOR APPLYING A BRAZING MEDIUM TO A CONFIGURATION

(75) Inventor: Ludwig Wieres, Overath (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/627,187

(22) Filed: Jul. 27, 2000

Related U.S. Application Data

(63) Continuation of application No. PCT/EP99/00390, filed on Jan. 21, 1999.

(30) Foreign Application Priority Data

Jan. 27, 1998 (DE) ......................................... 198 03 012

(51) Int. Cl.$^7$ .............................................. B23K 31/02
(52) U.S. Cl. ...................................... 228/175; 228/183
(58) Field of Search ............................... 228/175, 183, 228/182, 181; 502/527.19

(56) References Cited

U.S. PATENT DOCUMENTS

| | | | | |
|---|---|---|---|---|
| 4,948,774 A | * | 8/1990 | Usui et al. ................... | 502/439 |
| 5,413,767 A | * | 5/1995 | Breuer et al. ................ | 422/174 |
| 5,431,330 A | * | 7/1995 | Wieres ........................ | 228/181 |
| 5,593,646 A | | 1/1997 | Koshiba et al. | |
| 5,608,968 A | * | 3/1997 | Maus et al. ................... | 29/890 |
| 5,648,176 A | * | 7/1997 | Nakagawa et al. ......... | 428/593 |
| 5,665,669 A | * | 9/1997 | Yamanaka et al. .......... | 420/103 |
| 6,060,173 A | * | 5/2000 | Retallick .................... | 428/593 |
| 6,145,195 A | * | 11/2000 | Wieres ........................ | 29/890 |
| 6,425,517 B1 | * | 7/2002 | Wieres et al. ............. | 228/248.1 |

FOREIGN PATENT DOCUMENTS

| | | |
|---|---|---|
| DE | 29 24 592 A1 | 1/1981 |
| EP | 0 245 738 A1 | 11/1987 |
| EP | 0 590 596 A1 | 4/1994 |
| JP | 06 182 222 | 7/1994 |
| JP | 06 182 223 | 7/1994 |
| WO | WO 89/11938 | 12/1989 |
| WO | WO 93/25339 | 12/1993 |
| WO | WO 94/06594 | 3/1994 |
| WO | WO 96/26805 | 9/1996 |

* cited by examiner

*Primary Examiner*—Tom Dunn
*Assistant Examiner*—Zidia Pittman
(74) *Attorney, Agent, or Firm*—Laurence A. Greenberg; Werner H. Stemer; Gregory L. Mayback

(57) ABSTRACT

A method for applying a brazing medium to a configuration, which is formed of a honeycomb body and a jacket pipe is described. First, the honeycomb body is configured by stacking and/or winding of sheet metal layers, at least some of which are structured sheet metals layers such that the honeycomb body has channels for conducting a fluid flow. The honeycomb body is partially placed in the jacket pipe. A section of the honeycomb body that projects out from the jacket pipe is brought by its end face into contact with an adhesive medium. The honeycomb body is further introduced into the jacket pipe. Subsequently, a brazing medium is introduced into the honeycomb body.

17 Claims, 1 Drawing Sheet

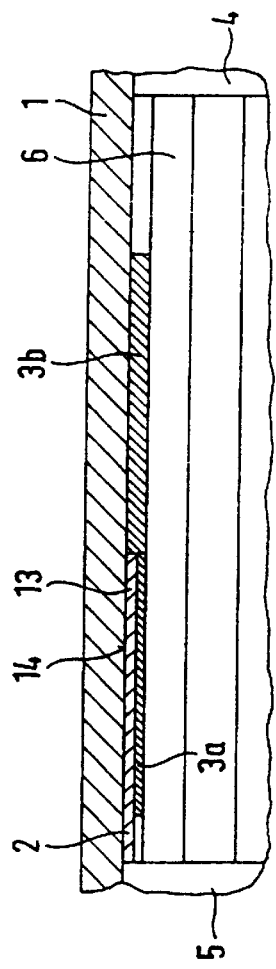
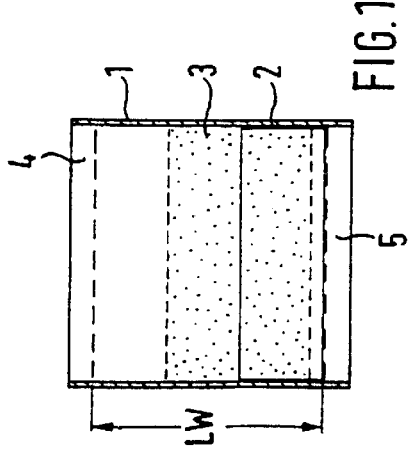
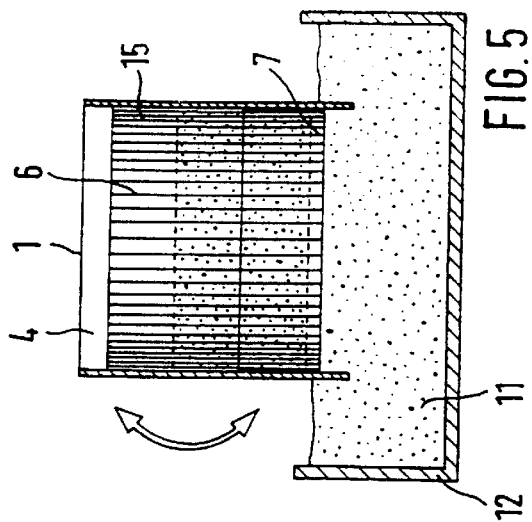
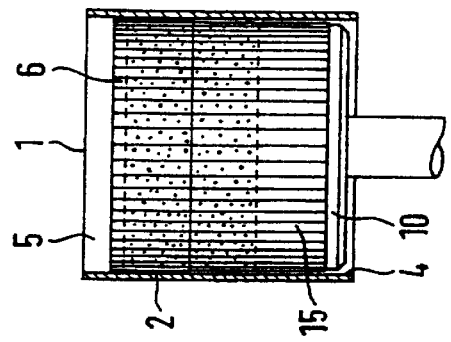
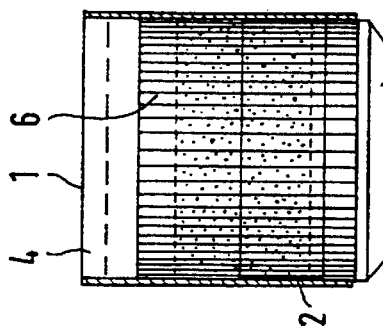
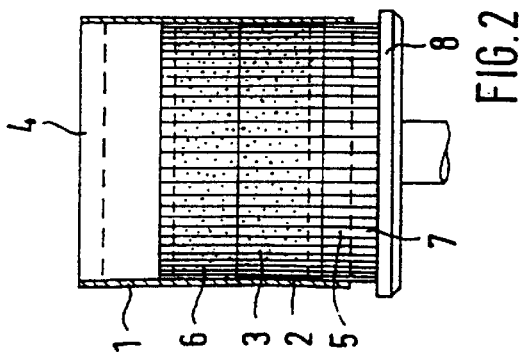

METHOD FOR APPLYING A BRAZING MEDIUM TO A CONFIGURATION

CROSS-REFERENCE TO RELATED APPLICATION

This is a continuation of International Application PCT/EP99/00390, filed Jan. 21, 1999, which designated the United States.

BACKGROUND OF THE INVENTION

Field of the Invention

The present invention relates to a method for applying a brazing medium to a configuration formed of a honeycomb body disposed in a jacket pipe.

Honeycomb bodies that are made by stacking and/or winding sheet metal layers, at least some of which are structured sheet metal layers, are known in many forms. Such honeycomb bodies are used, for example, as supporting bodies for catalytically active coatings. Such coated honeycomb bodies are used, for example, as catalytic converter supporting bodies. In particular for internal combustion engines, as are used, for example, in automotive vehicles, the honeycomb bodies together with the jacket pipe form a part of an exhaust system. Different configurations of a catalytic converter supporting body are described, for example, in Published, European Patent Application EP 0 245 738 A1.

The stacked and/or wound sheet metal layers are at least partially brazed one to another, so that a monolithic honeycomb body is produced. It is known for the honeycomb body to be at least partially brazed to the jacket pipe in which it is disposed. In this case the brazing medium is introduced into the brazing areas of the metal sheets and of the jacket pipe.

Methods for applying an adhesive medium and a brazing medium to a metallic configuration formed of a honeycomb body and a jacket pipe are known, for example, from International Patent Disclosures WO 89/11938, WO 94/06594, WO 93/25339 and Published, Non-Prosecuted German Patent Application DE 29 24 592 A1.

It is known from the prior art for the honeycomb body to be at least in part provided with an adhesive medium to which a brazing powder adheres. The methods known from the prior art differ with respect to implementation of the method in the sequence of applying the adhesive medium and the brazing powder during or after the configuration of the honeycomb. A comprehensive presentation of the prior art is contained in International Patent Disclosure WO 89/11938.

The different implementations of the method with respect to the application of the brazing medium to the configuration have different advantages. The economical manufacture of the configuration is sought, however, in methods for application of the brazing medium in which the brazing medium is simply introduced into the areas in which a brazed connection is to be produced. The procedure for applying the brazing medium should be as fast as possible and done with a relatively small expenditure.

The known configuration that includes the honeycomb body disposed in the jacket pipe, is configured such that the jacket pipe projects over the honeycomb body at least in an edge section. In other words, the honeycomb body is disposed in the jacket pipe such that at least an end face of the honeycomb body is at a distance from an adjacent end face of the jacket pipe.

Such projecting edge sections of the jacket pipe form connecting areas, so the configuration can be connected to other components or elements. Thus, for example, when such a configuration is used in an exhaust system, a diffusor can be provided on one connecting area of the jacket pipe, which, for example, is connected to an exhaust pipe of an exhaust system of an internal combustion engine. It is also known for the jacket pipe to have two connecting areas, which are configured on the respective ends of the jacket pipe, wherein in these connecting areas there is substantially no honeycomb body.

Due to the previously described connecting area of the jacket pipe, transferring of the method known from the prior art for applying the brazing medium to the configuration of this type has certain disadvantages.

If the method known, for example, from Published, Non-Prosecuted German Patent Application DE 29 24 592 A1 is used for joining the honeycomb body to the jacket pipe, in which the honeycomb body together with the jacket pipe is immersed in a bath containing an adhesive liquid and is subsequently provided with powdered brazing medium, the connecting areas of the jacket pipe are also provided with the brazing medium, without this being necessary. The connecting areas are not only provided with the adhesive medium on an inside surface of the jacket pipe, but also on an outside surface of the jacket pipe. This is undesirable, as it leads to the spreading of the adhesive medium. In particular, the manipulating tools that engage with an outside surface of the jacket pipe are brought into contact with the adhesive medium. Considerable expenditure for cleaning the manipulating tools is sometimes necessary.

The methods further described in the Published, Non-Prosecuted German Patent Application DE 29 24 592 A1 are basically suitable for applying the brazing medium to the jacket pipe and to the honeycomb body, wherein these methods for applying the brazing medium are relatively costly.

SUMMARY OF THE INVENTION

It is accordingly an object of the invention to provide a method for applying a brazing medium to a configuration that overcomes the disadvantages of the prior art methods of this general type, which makes efficient production of the configuration possible.

In order to apply the brazing medium to the configuration which includes the honeycomb body and the jacket pipe, it is proposed that the honeycomb body is first constructed by stacking and/or winding sheet metal layers, at least some of which are structured sheet metal layers, such that it has channels which can conduct a fluid flow. The honeycomb body is partially introduced into the jacket pipe. The section of the honeycomb body projecting from the jacket pipe is brought into contact, with its end face, with an adhesive liquid. Afterwards the honeycomb body is introduced in the jacket pipe and the brazing medium is introduced into the honeycomb body.

Because only the section of the honeycomb body projecting out of the jacket pipe is brought into contact with the adhesive liquid, the jacket pipe is prevented from also coming into contact with the adhesive liquid. In this way, the jacket pipe is free of the adhesive medium, whereby the brazing powder does not adhere to the jacket pipe.

Because the jacket pipe is not provided with the adhesive medium, it is unnecessary to optionally free the jacket pipe from the adhesive medium in order to prevent the spreading of the adhesive medium.

Because the section projecting from the jacket pipe is brought into contact with the adhesive medium, whereby the honeycomb body is at least in part provided in its axial direction with the adhesive medium, the honeycomb body is also provided with the adhesive medium over its entire cross-sectional surface. Therefore, even edge areas of the honeycomb body can be provided with the brazing powder without any problems. In this way it is guaranteed that a reliable brazed joint can be configured even in the edge area of the honeycomb body and respectively between the honeycomb body and the jacket pipe.

According to a further advantageous feature of the method, it is proposed that prior to the application of the brazing medium, a section of the honeycomb body opposite the section is brought into contact with the adhesive medium. In particular with the configuration which has the jacket pipe, wherein the jacket pipe has a connecting area on each of the opposite ends, it is proposed that the honeycomb body is pushed through the jacket pipe so that one section projects out of the jacket pipe. This section is brought into contact with the adhesive liquid. After the honeycomb body is introduced in the jacket pipe such that the honeycomb body does not substantially lie in the connecting areas of the jacket pipe.

For stable handling of the configuration, it is proposed that the honeycomb body is introduced into the jacket pipe such that while one or the other section is brought into contact with the adhesive medium, the honeycomb body is located, over a substantial part of its axial length, in the jacket pipe. In this way, the configuration has an advantageously positioned center of gravity that prevents the configuration from toppling over.

In particular it is proposed that the honeycomb body is introduced in the jacket pipe such that it projects at least 1 mm, preferably 5 mm, out of the jacket pipe. This extent is sufficient to prevent the jacket pipe from also coming into contact with the adhesive medium.

The honeycomb body and the jacket pipe have different thermal expansion behavior. It has therefore been sought to avoid having a rigid connection between the respective end areas of the honeycomb body. If there are no rigid connections in the respective end areas of the honeycomb body with the jacket pipe, thermal stresses between the jacket pipe and the honeycomb body are avoided. It is already known per se from International Patent Disclosure WO 96/26805 how such thermal stresses can be avoided by suitable brazing of the honeycomb body to the jacket pipe. According to an advantageous configuration of the method according to the invention, thermal stresses between the honeycomb body and the jacket pipe are avoided in that a sleeve-shaped element is introduced in the jacket pipe. The sleeve-shaped element has an outside jacket which comes substantially into contact with a part of the inside jacket surface of the jacket pipe, and in which the honeycomb body is disposed. Brazing of the honeycomb body to the jacket pipe is prevented by this sleeve-shaped element. The sleeve-shaped element simply extends over a part of the axial extent of the jacket pipe and of the honeycomb body. The sleeve-shaped element is preferably formed as a foil.

Because of the manufacturing technology, the jacket pipe is somewhat out-of-round. There are also tolerances with respect to the variations of an internal diameter of the jacket pipe. Due to this, a gap forms between the internal jacket surface of the jacket pipe and the element. Because the honeycomb body is brought into contact with the adhesive medium when projecting out of the jacket pipe, the adhesive medium is prevented from getting into the gap between the element and the jacket pipe.

Therefore, the gap also remains substantially free of brazing medium after the brazing medium is applied. In this way it is also ensured that there is no brazed connection between the jacket pipe and the sleeve-shaped element. On the other hand, it is also ensured that the honeycomb body can also be brazed as far as the sleeve-shaped element and also to the sleeve-shaped element.

Preferably, the sleeve-shaped element is connected to the jacket pipe such that when the honeycomb body is placed in the jacket pipe, the sleeve-shaped element stays in a predetermined position even though the honeycomb body, which is pressed in the axial direction and as a consequence the sleeve-shaped element also is, and because of this exerts a force upon the sleeve-shaped element in the direction of introduction of the honeycomb body. In particular it is proposed that the element is materially joined to the jacket pipe. This can, for example, be a welded connection. Alternatively, or in addition, the element can be glued to the jacket pipe. The connection between the sleeve-shaped element and the jacket pipe is preferably made such that the strength of the connection is less than the strength of a connection between the element and the honeycomb body. In particular with the adhesive bonding of the element and the jacket pipe, this can be increased during a brazing process because of the temperatures prevailing during the brazing process. Because the connection between the element and the jacket pipe is not as strong as the connection between the element and the honeycomb body, it is also ensured that thermal stresses between the jacket pipe and the honeycomb body are not conducted due to the element into the honeycomb body. Preferably, the element is manufactured from the same material as the honeycomb body and/or the jacket pipe. The connection between the element and the jacket pipe is substantially an assembly connection by which it is ensured that during assembly, that is to say during introduction of the honeycomb body in the jacket pipe, the element does not change its position.

In order to braze the honeycomb body in an axial portion of the jacket pipe and with the sleeve-shaped element, it is proposed that at least one brazing section is configured which overlaps the honeycomb body and the element. This is preferably a brazing section closed when viewed in the direction of the periphery of the jacket pipe.

According to a further advantageous feature of the method, it is proposed that the section to be wetted with the adhesive medium is brought into contact with an applicator device which contains the adhesive medium. Whereby the applicator device is provided with a wetting surface which is larger than an end face of the section, and completely overlaps it. By this advantageous further development of the method, it is ensured that the section of the honeycomb body can be brought into contact over its entire cross-section with the adhesive medium. The advantage of this implementation of the method is also in that the same applicator device can be used for wetting honeycomb bodies that have different cross-section areas. It is therefore unnecessary to match the applicator device to different cross-sectional geometry of honeycomb bodies.

Advantageously, the configuration is substantially brought into contact with the adhesive medium in a vertical position, that is to say the longitudinal axis of the honeycomb body is substantially vertical. The applicator device can be disposed below the honeycomb body, for contacting the section of the honeycomb body. An implementation of the method is preferred in which the applicator device is disposed above the jacket pipe and the section is brought into contact with the applicator device.

With such a configuration of the applicator device, the adhesive medium also flows into the section due to gravity. Depending on the contact time of the section with the applicator device, and/or on the dwell time of the honeycomb body in this vertical position, it can be ensured that the adhesive medium is introduced into it over the entire axial length of the honeycomb body or over a part of the axial length of the honeycomb body. In order to provide the honeycomb body in areas relevant to a brazed connection with the adhesive medium, it is not necessary for them to remain for a correspondingly long time on the applicator device. It is sufficient when the section remains in contact with the applicator device, in particular with the adhesive medium, for as long as sufficient adhesive medium gets into the individual channels of the honeycomb body, so a sufficient wetting of the areas relevant for configuring a brazed connection takes place. By the implementation of the method, it is also no longer necessary to bring the honeycomb body into contact with the adhesive medium on both sides. In particular, the time which is necessary for transporting the configuration from a wetting point in which the adhesive medium is introduced into the honeycomb body, to the brazing medium application point, in which the brazing powder is introduced into the honeycomb body, is used for automatic transport of the adhesive medium inside the honeycomb body when the honeycomb body is transported in its vertical position.

In particular with the application of the adhesive medium by an applicator device disposed above the honeycomb body, it is advantageous that the adhesive medium carrier is configured to be substantially elastic and absorbent. If, for example, the section is pressed against the adhesive medium carrier that contains the adhesive medium, it is ensured that the adhesive medium leaves the adhesive medium carrier and it enters into the section. It is also possible to press the adhesive medium carrier against the section of the honeycomb body.

Alternatively, the configuration and the adhesive medium carrier can be moved relatively to one another such that they press against one another.

When there is a serial application of the brazing medium, the individual honeycomb bodies are successively brought into contact with the adhesive medium carrier. If the honeycomb bodies are pressed against the adhesive medium carrier, there is the risk that due to material fatigues the adhesive medium undergoes a structural breakdown which can lead to an insufficient introduction of the adhesive medium in the section. This can lead to an insufficient adhesive medium being made available, on which the brazing powder adheres to. In order to ensure that a sufficient adhesive medium can be introduced into the section of the honeycomb body, it is proposed that contact surfaces occurring during a contact of the section with the adhesive medium carrier or with the adhesive medium, only a partially overlap occurs during at least two successive configurations. This proposal is based on the consideration that the adhesive medium carrier is not contacted on the same places by successive configurations, whereby the adhesive medium carrier is, at least partially, not stressed in the same places, so material fatigue of the adhesive medium carrier cannot occur, or only with great delay.

Other features which are considered as characteristic for the invention are set forth in the appended claims.

Although the invention is illustrated and described herein as embodied in a method for applying a brazing medium to a configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic, sectional view of a jacket pipe with an element and a brazing section according to the invention;

FIG. 2 is a sectional view of the configuration during an application of an adhesive liquid;

FIG. 3 is a sectional view of an introduction of a honeycomb body in the jacket pipe;

FIG. 4 is a sectional view showing an application of the adhesive liquid on a second section of the honeycomb body;

FIG. 5 is a sectional view showing an introduction of a brazing medium in the honeycomb body; and FIG. 6 is an enlarged, sectional view of an edge area of the configuration.

DESCRIPTION OF THE PREFERRED EMBODIMENTS

In all the figures of the drawing, sub-features and integral parts that correspond to one another bear the same reference symbol in each case. Referring now to the figures of the drawing in detail and first, particularly, to FIG. 1 thereof, there is shown, in section, a jacket pipe 1. The jacket pipe 1 preferably has a substantially circular cross-section. On respective end sections of the jacket pipe 1 connecting areas 4, 5 are configured. The connecting areas 4, 5 are designated by the broken lines. The connecting areas 4, 5 are provided for connecting the configuration to further components, which are not shown. In particular, each of the connecting areas 4, 5 can be connected to a component of an exhaust system of an internal combustion engine.

An axial section of the jacket pipe 1 lying between the connecting areas 4, 5 has a length LW which substantially corresponds to an axial extent of a honeycomb body 6.

A sleeve-shaped element 2 is introduced into the jacket pipe 1. The sleeve-shaped element 2 has an outside jacket 13 that comes substantially into contact with a part of an inside jacket surface 14 of the jacket pipe 1, as can be seen in particular in FIG. 6. The sleeve-shaped element 2 is preferably configured in an annular manner viewed in the direction of the periphery. As can be seen from FIG. 1, and in particular from FIG. 6, the sleeve-shaped element 2 extends over a part of the axial extent of the jacket pipe 1. The axial extent of the sleeve-shaped element 2 is smaller than the axial extent of the honeycomb body 6, as can be seen from FIG. 6.

The sleeve-shaped element 2 is connected to the jacket pipe 1. A brazing section is labeled with the reference numeral 3, which partly overlaps the jacket pipe 1 and the sleeve-shaped element 2. The brazing section 3 has a first section 3a, which substantially corresponds to the axial extent of the element 2. The first brazing section 3a is connected to a second brazing section 3b that extends in the direction of the connecting area 4.

Due to the first section 3a of the brazing section 3, a brazed connection between the honeycomb body 6 and the element 2 takes place. Due to the second brazing section 3b the honeycomb body 6 is connected to the jacket pipe 1. At least the axial extent of the element 2 forms a compensating segment by which the different thermal expansions of the jacket pipe 1 and the honeycomb body 6 can be compensated for. The brazing section 3 can also be provided which extends over the entire length LW.

The honeycomb body 6 is introduced into the jacket pipe 1 with the sleeve-shaped element 2. The honeycomb body 6 is introduced into the jacket pipe 1 such that a section 7 projects from the jacket pipe 1, as can be seen from FIG. 2. The section 7 of the honeycomb body 6 is brought into contact with an adhesive medium, in particular a liquid adhesive. The liquid adhesive is made available in an applicator device 8. Wetting of the honeycomb body 6 is done from an end face in the axial direction of the honeycomb body 6. As can be seen in particular from FIG. 2, the applicator device 8 is configured such that the adhesive medium surface available is larger than the cross-section of the honeycomb body 6, so that wetting with the adhesive medium over the entire cross-section of the honeycomb body 6 is possible.

Once sufficient wetting of the honeycomb body with the adhesive liquid is done, the honeycomb body 6 is placed in the jacket pipe 1. The introduction of the honeycomb body 6 is preferably done by a stamp 9 by which a force is exerted in the axial direction of the jacket pipe 1 upon the honeycomb body 6. A suitable pressure pad engages with the jacket pipe 1, which is not shown and by which the jacket pipe 1 is held. The honeycomb body 6 is introduced into the jacket pipe 1 until it lies between the connecting areas 4, 5, as can be seen in particular from FIG. 6.

FIG. 4 shows that prior to the introduction of a brazing medium, a further section 15 of the honeycomb body 6 opposite the section 7 is brought into contact with the adhesive medium. The adhesive medium is made available by an applicator device 10. As can be seen from FIG. 4, the cross-section of the applicator device 10 is somewhat smaller than the cross-section of the honeycomb body 6, so that the applicator device 10 can be partially introduced into the jacket pipe 1.

After the further section 15 has been provided with the adhesive medium, a brazing powder 11 is placed in the honeycomb body 6. The procedure of introducing the brazing medium 11 in the honeycomb body 6 is done such that the honeycomb body 6 is pressed by its end face into the brazing powder 11. Subsequently the honeycomb body 6 together with the jacket pipe 1 is reversed and the opposite end face is pressed into the brazing powder 11. The brazing powder 11 is made available in a container 12.

I claim:

1. A method for applying a brazing medium, which comprises the steps of:
   providing a configuration having a honeycomb body formed by at least one of stacking and winding sheet metal layers, at least some of the sheet metal layers are structured sheet metal layers so that the honeycomb body has channels formed therein for conducting a fluid flow;
   partially placing the honeycomb body in a jacket pipe;
   bringing an end face of an axial section of the honeycomb body projecting out from the jacket pipe into contact with an adhesive medium;
   introducing the honeycomb body further into the jacket pipe; and
   introducing the brazing medium at least into the honeycomb body.

2. The method according to claim 1, which comprises prior to the introduction of the brazing medium, bring a further section of the honeycomb body disposed opposite the section into contact with the adhesive medium.

3. The method according to claim 2, which comprises pushing the honeycomb body through the jacket pipe such that the further section projects from the jacket pipe.

4. The method according to claim 2, which comprises introducing the honeycomb body into the jacket pipe such that the honeycomb body is located over a substantial part of its axial length in the jacket pipe while one of the section and the further section is brought into contact with the adhesive medium.

5. The method according to claim 4, which comprises introducing the honeycomb body in the jacket pipe such that it projects out by at least 1 mm from the jacket pipe.

6. The method according to claim 1, which comprises introducing a sleeve-shaped element into the jacket pipe, the sleeve-shaped element having an outer jacket which substantially comes into contact with a part of an inside jacket surface of the jacket pipe, and in which jacket pipe the honeycomb body is disposed.

7. The method according to claim 6, which comprises connecting the sleeve-shaped element to the jacket pipe.

8. The method according to claim 7, which comprises materially connecting the sleeve-shaped element to the jacket pipe.

9. The method according to claim 7, which comprises gluing the sleeve-shaped element to the jacket pipe.

10. The method according to claim 6, which comprises providing at least one brazing section which overlaps the jacket pipe and the sleeve-shaped element.

11. The method according to claim 1, which comprises bring the section into contact with an applicator device containing the adhesive medium, the applicator device having a wetting surface which is larger than the end face of the section and overlaps it completely.

12. The method according to claim 1, which comprises positioning the configuration substantially vertically such that the section projecting from the jacket pipe is brought into contact with an applicator device disposed above the jacket pipe.

13. The method according to claim 11, which comprises providing the application device as a substantially elastic adhesive medium carrier and pressing at least the section against the substantially elastic adhesive medium carrier.

14. The method according to claim 13, which comprises positioning at least one of the configuration and the adhesive medium carrier such that contact surfaces which occur during contact of the section with one of the adhesive medium carrier and the adhesive medium, only partially overlap with at least two consecutive configurations.

15. The method according to claim 4, which comprises introducing the honeycomb body in the jacket pipe such that it projects out by 5 mm from the jacket pipe.

16. A method for applying a brazing medium, which comprises the steps of:
   providing a configuration having a honeycomb body formed by at least one of stacking and winding sheet metal layers, at least some of the sheet metal layers are structured sheet metal layers so that the honeycomb body has channels formed therein for conducting a fluid flow;
   partially placing the honeycomb body in a jacket pipe;
   bringing an end face of a section of the honeycomb body projecting out from the jacket pipe into contact with an adhesive medium for providing the adhesive medium entirely over a cross-section of the honeycomb body;

introducing the honeycomb body further into the jacket pipe; and introducing the brazing medium at least into the honeycomb body.

17. A method for applying a brazing medium, which comprises the steps of:

providing a configuration having a honeycomb body formed by at least one of stacking and winding sheet metal layers, at least some of the sheet metal layers are structured sheet metal layers so that the honeycomb body has channels formed therein for conducting a fluid flow;

partially placing the honeycomb body in a jacket pipe;

bringing an end face of a section of the honeycomb body projecting out from the jacket pipe into contact with an adhesive medium, for keeping the jacket pipe free of the adhesive medium;

introducing the honeycomb body further into the jacket pipe; and introducing the brazing medium at least into the honeycomb body.

* * * * *